United States Patent
Baker

[11] Patent Number: 6,003,559
[45] Date of Patent: Dec. 21, 1999

[54] PIPE-IN-A-PIPE BUNDLE APPARATUS

[76] Inventor: Jerry G. Baker, 202 Greenwood St., Houma, La. 70364

[21] Appl. No.: 09/057,843

[22] Filed: Apr. 9, 1998

Related U.S. Application Data

[60] Provisional application No. 60/056,227, Aug. 21, 1997.
[51] Int. Cl.$^6$ .................................................. F16L 55/00
[52] U.S. Cl. ........................ 138/108; 138/112; 138/110; 138/117; 138/149; 138/113
[58] Field of Search .................................. 138/113, 112, 138/117, 119, 108, 110, DIG. 10, 149

[56] References Cited

U.S. PATENT DOCUMENTS

| | | | |
|---|---|---|---|
| 2,029,369 | 2/1936 | Halliburton | 138/149 |
| 2,706,496 | 4/1955 | Bond . | |
| 2,896,669 | 7/1959 | Broadway et al. . | |
| 2,938,569 | 5/1960 | Goodrich et al. . | |
| 3,213,889 | 10/1965 | Cotman . | |
| 3,379,027 | 4/1968 | Mowell et al. . | |
| 3,540,487 | 11/1970 | LoRusso . | |
| 3,783,907 | 1/1974 | Skinner . | |
| 3,786,379 | 1/1974 | Lutchansky . | |
| 3,800,486 | 4/1974 | Harvey . | |
| 3,955,601 | 5/1976 | Plummer, III | 138/149 |
| 4,182,378 | 1/1980 | Dieter . | |
| 4,194,536 | 3/1980 | Stine et al. | 138/149 |
| 4,233,816 | 11/1980 | Hensley . | |
| 4,335,267 | 6/1982 | Hopkins | 138/108 |
| 4,607,665 | 8/1986 | Williams . | |
| 4,896,701 | 1/1990 | Young . | |
| 4,962,826 | 10/1990 | House | 138/110 |
| 5,018,260 | 5/1991 | Ziu | 138/108 |
| 5,069,255 | 12/1991 | Muszynski . | |
| 5,441,082 | 8/1995 | Eskew et al. . | |
| 5,458,438 | 10/1995 | Wyke et al. . | |
| 5,503,191 | 4/1996 | Morris . | |
| 5,592,975 | 1/1997 | Wissmann et al. . | |
| 5,725,028 | 3/1998 | Cleland | 138/149 |
| 5,791,380 | 8/1998 | Onan et al. | 138/149 |

*Primary Examiner*—James F. Hook
*Attorney, Agent, or Firm*—Garvey, Smith, Nehrbass & Doody, LLC

[57] ABSTRACT

A piping system for conveying one or more product flow lines within an outer casing includes a layer of insulation on each of the product flow lines to prevent heat lost and an improved spacer arrangement forming an interface between the product flow lines and the casing to prevent damage to the casing and flow lines as well as reduce friction when the flow lines are pulled through the casing. The spacer includes a pair of halves that can be assembled together using a bolted connection, for example, with flanges provided on the halves. An integral polymeric body comprises each of the halves with projecting portions spaced circumferentially about each of the spacers, the projecting portions extending longitudinally and radially and having inclined surfaces that lessen stress during the pulling of product flow lines through the outer casing. Annular shoulders on the spacer mate with corresponding annular shoulders of the insulation layer to prevent heat loss at the interface.

21 Claims, 8 Drawing Sheets

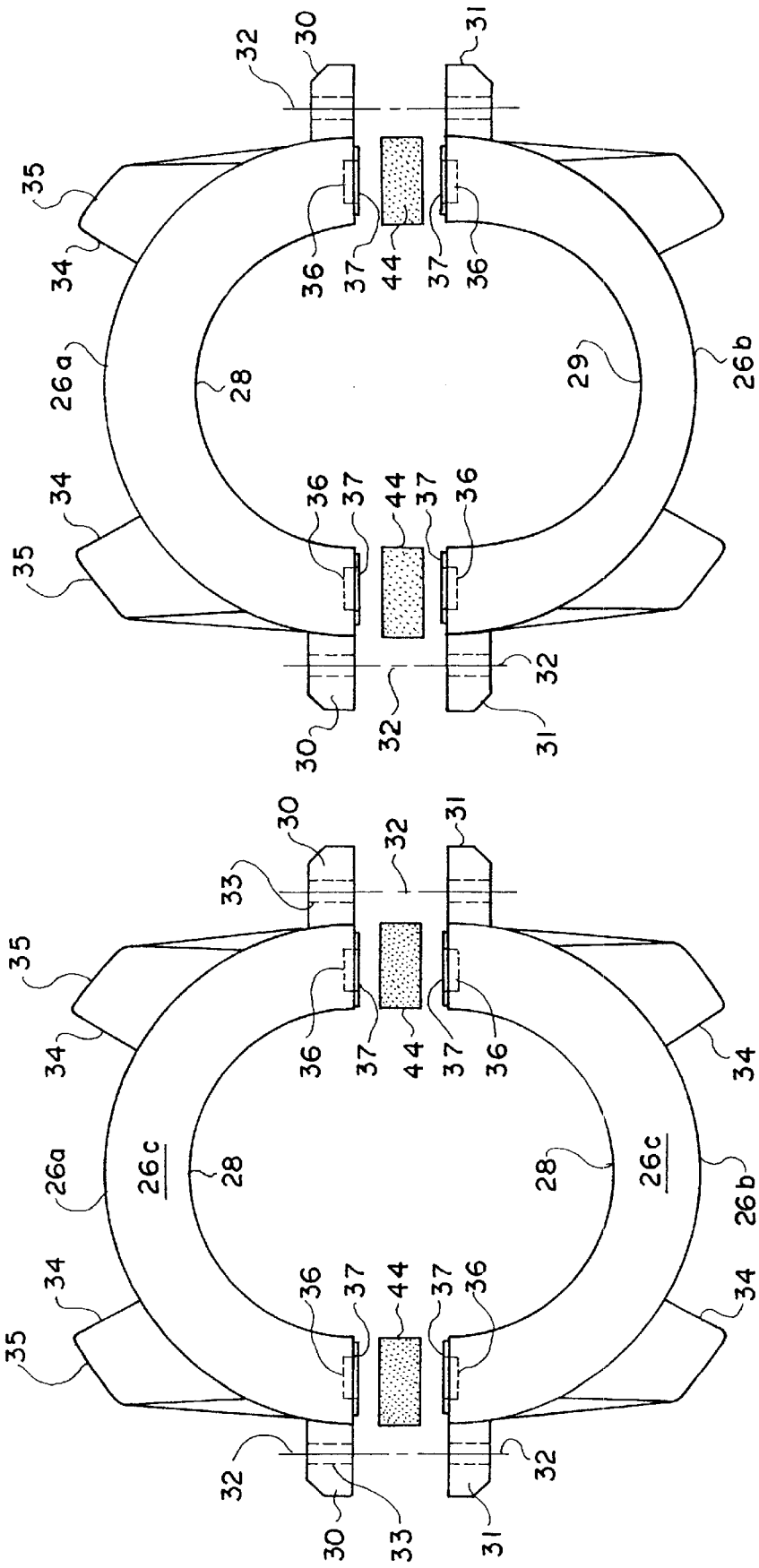

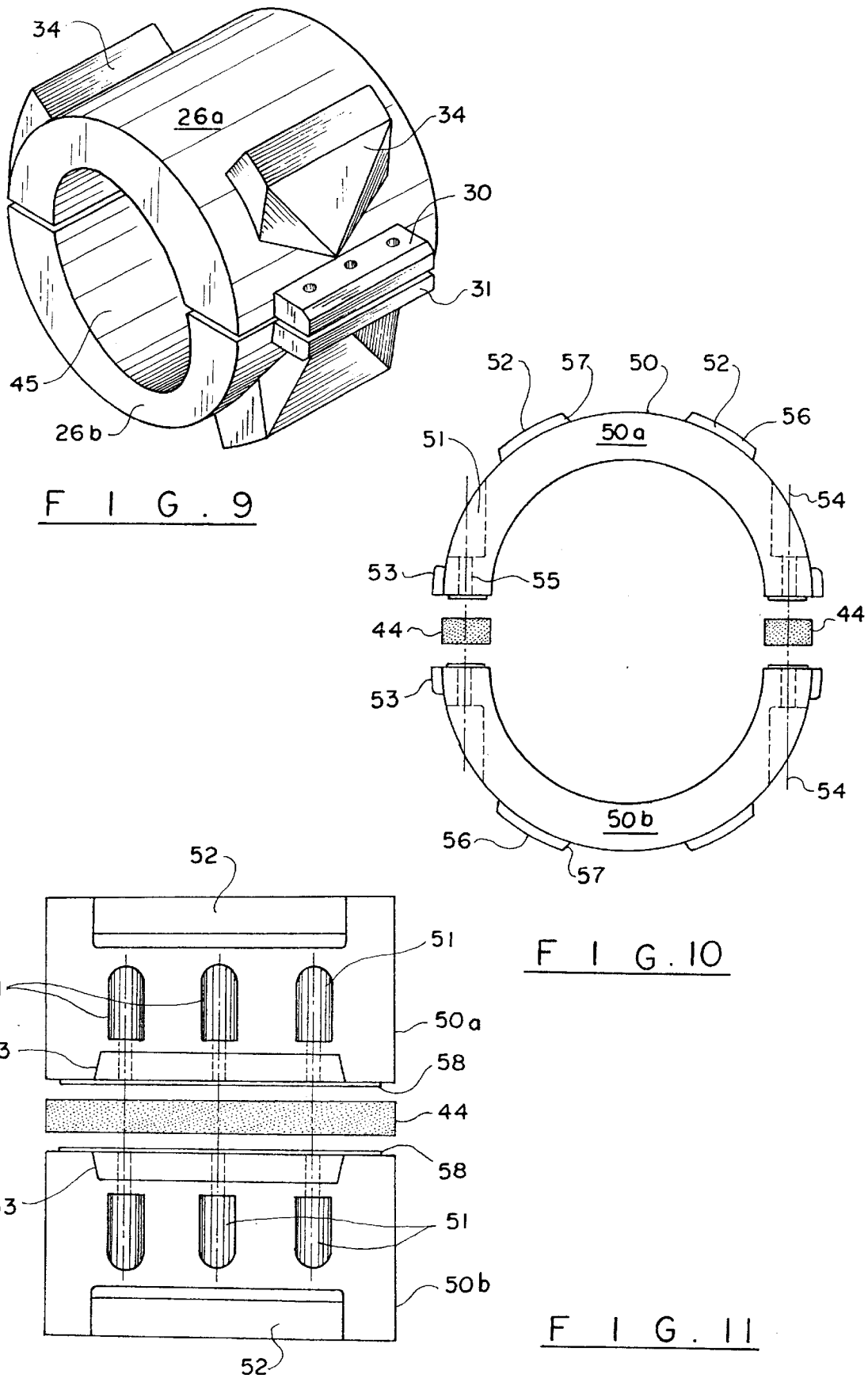

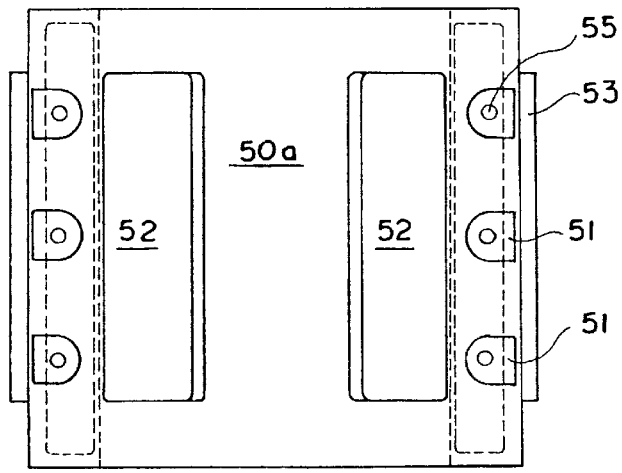
F I G. 12
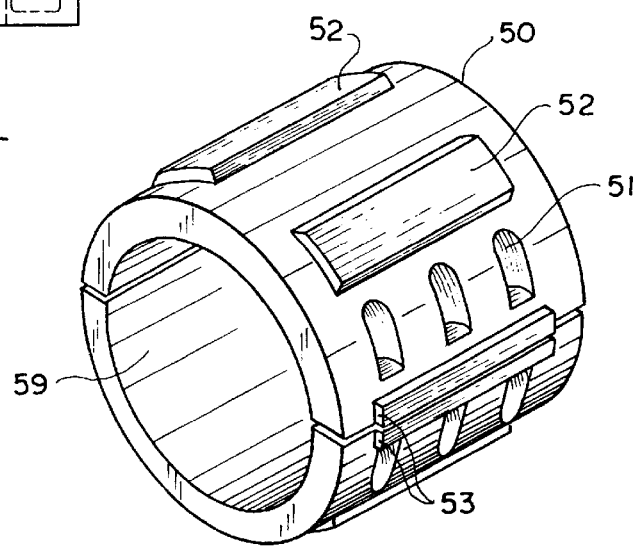
F I G. 13
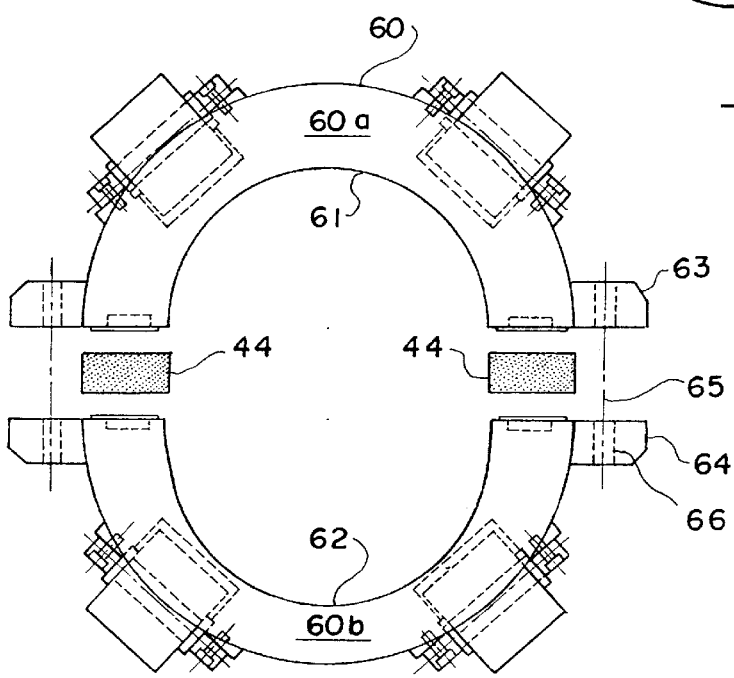
F I G. 14

PIPE-IN-A-PIPE BUNDLE APPARATUS

CROSS-REFERENCE TO RELATED APPLICATIONS

Priority of U.S. Provisional Patent Application Serial No. 60/056,227, filed Aug. 21, 1997, incorporated herein by reference, is hereby claimed.

Disclosure Document No. 411,183, filed Jan. 21, 1997, is hereby incorporated by reference. In accordance with M.P.E.P. Section 1706, please retain Disclosure Document No. 411,183, filed Jan. 21, 1997 and entitled "PIPE WITHIN A PIPE FLOWLINE BUNDLE SPACER".

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to piping and piping assemblies, and more particularly to an assembly that includes an outer casing with one or more smaller insulated flow lines disposed within the outer casing and a plurality of spacers positioned along the flow lines at intervals, the spacers being configured to enable the product flow lines to be pulled through the outer casing during placement.

2. General Background of the Invention

With the advent of deep-water hydrocarbon production from depths exceeding 3,000 feet below mean seal level (msl) one of the methods for installing production flow lines has been to install one or more production flow lines inside an outer carrier or casing pipe. The casing pipe and flow line(s) are pre-welded in long lengths and then the flow line(s) are pulled into the casing pipe by means of a pull winch. The flow line(s) normally has a rigid polyisocyanurite insulation jacket complete encircling the line to keep the hydrocarbon from losing heat. This insulation must be protected from dragging against the casing or it will become torn, dismembered, or ruptured. The insulation jacket must fit snugly against the spacer and sealed in order not to allow heat transfer to take place.

This type of insulated pull-in piping segments are used in both the bottom tow flow line bundle method for installing long land fabricated cased flow line bundle segments that are towed on the ocean bottom to their final installation point and the reel barge method of laying cased flow lines segments that are put together on land, reeled onto the spool barge and then unreeled at the final installation point.

Since this is relatively new technology there have been very few previous projects in the scope of this invention. Previous approaches have required spacers on land and marine cased crossings to use numerous thin short pull spacers to be placed 5–7 feet apart. These spacers were designed to withstand minimal drag and pressure to be exerted on the part and were used to pull a short section of flow line 300 feet or less into a casing pipe.

Several patents have issued that disclosed generally the concept of disposing one pipe or conduit inside of another and wherein spacers form an interface between the inner and outer pipes. The Bond U.S. Pat. No. 2,706,496 discloses a concentric pipe insulator and spacer that includes a plurality of longitudinally extending ribs connected with cable, each of the ribs providing two spaced apart rollers that are provided to contact an outer casing.

In the Cotman U.S. Pat. No. 3,213,889, there is provided a pipe support in the form of a collar that surrounds an inner pipe disposed within an outer pipe.

The Mowell U.S. Pat. No. 3,379,027 discloses a roller supported LNG pipeline that includes an inner pipe having a plurality of rollers extending from the outer surface thereof and wherein the rollers contact the inner wall of an outer casing.

In the Lutchansky U.S. Pat. No. 3,786,379, there is provided a waveguide structure that utilizes roller spring supports for supporting a waveguide in a conduit to simultaneously provide a compliance support and allow free relative longitudinal movement between the waveguide and the conduit. A tension band having a plurality of spring assemblies integrally formed therewith is fastened about eh periphery of the waveguide. Rollers are mounted on the spring assemblies in contact with the conduit to allow free relative longitudinal movement of the waveguide and conduit. The spring assemblies provide a soft compliant support through a range of deflections accommodating the worst expected thermal loading conditions in route bends. Under higher loading the spring assemblies bottom out and provide a stiff support to prevent further radial deflection of the waveguide with respect to the conduit.

A cryogenic fluid transfer line is provided in U.S. Pat. No. 4,233,816 which comprises an interior conduit for passage therethrough of cryogenic fluid, an exterior conduit concentrically spaced about the interior conduit and defining the exterior of the fluid transfer line, an annular heat transfer shield generally concentric with and interjacent to the interior and exterior conduits and including at least one longitudinally extending resilient arcuate member with a longitudinally extending generally arcuate hooking edge, at least one longitudinally extending resilient arcuate member with a longitudinally extending generally arcuate catching edge, where the hooking and catching edge members are interlockingly engageable with each other when the member including the hooking edge is flexed to a smaller arcuate radius, positioned with its hooking edge inboard of the catching edge and then permitted to relax, each set of engaged hooking and catching edges defining a hollow generally cylindrical next having a substantially closed curved surface with each next extending longitudinally substantially the length of the shield, with the shield further including longitudinally extending heat transfer conduits resident within each nest. Radiation shields are provided between the annular heat transfer shield and the interior and exterior conduits.

An underground pipe support device is the subject of U.S. Pat. No. 4,896,701 for supporting an underground pipe or cable within the encasement sleeve of a horizontally bored hole. The support device includes a round collar having two resiliently spaced-apart ends which can be urged together to secure the device to the underground pipe or cable. A plurality of equidistantly spaced-apart and outwardly extending support legs are provided around the circumference of the collar which terminate in an elongate foot having opposing ends inclined inwardly toward the collar. Each foot extends generally parallel to the longitudinal axis of the collar and has a greater length than the longitudinal length of the collar to facilitate placement and support of an underground pipe or conduit within the encasement sleeve of the underground hole.

The Muszynski U.S. Pat. No. 5,069,255 discloses a pipeline casing insulator to support a coated pipe within a tubular metallic casing. The pipeline casing insulator comprises a flexible belt formed of a material that is capable of bonding to an organic resin. A plurality of parallel bar-like runners are formed from an insulative and non-abrasive polymer concrete that is cast onto an outer facing surface of the belt. The belt is preferably a strip of an organic non-woven material. The polymer concrete is preferably a mixture of a thermosetting polymer resin, such as epoxy, polyester or polyrethane, and an aggregate. The aggregate preferably comprises a mixture of substantially incompressible coarse particulate material, such as sand or gravel, and fine filler material, such as calcium carbonate, silica flour, or kaolin. The inner facing surface of the belt preferably has a mastic coating covered by a release paper that can be removed, to allow attachment of the belt to the outer surface of the pipe by circumferentially wrapping the belt around the pipe.

A casing spacer that includes first and second elongated, steel shell members is disclosed in the Eskew U.S. Pat. No. 5,441,082. The casing spacer is comprised of stainless steel or high strength steel with corrosion inhibiting coatings, with each shell member having a semi-circular cross section for engaging and enclosing a carrier pipe within an outer casing. Attached to the outer surface of each of the first and second shell members are one or more adjustable risers for engaging the inner surface of the casing in maintaining the pipe, or pipes, in fixed position within the casing. Each riser includes a runner on its distal end to facilitate positioning of the spacer within the casing. The casing spacer's first and second shell members are securely coupled together by way of flange and nut and bolt combinations along one edge and a hook and eye arrangement along a second, opposed edge. The hook portion of one shell member is easily inserted in the eye portion of the second shell member followed by tightening of the nut and bolt combinations allowing a single worker to easily and quickly install the spacer about a carrier pipe and within a casing.

In the Morris U.S. Pat. No. 5,503,191 a length of elongate material such as rubber hose is supported and guided while being fed along a desired path of travel that extends through the hollow interior of a tubular structure. The tubular structure mounts an array of relatively closely spaced rollers that project into the hollow interior to guide and support the moving length of material. The tubular structure is formed as a "tube within a tube" assembly of "inner" and "outer" tubular members that closely interfit, and that sandwich roller support pins between overlying portions of the inner and outer tubular members. The roller support pins bridge roller positioning holes that are formed through the inner tubular member at an array of spaced locations. The rollers are rotatably mounted by the support pins and project through the positioning holes into the hollow interior of the tubular structure to engage outer surface portions of such elongate material as is being fed through the tubular structure to prevent the moving material from contacting stationary portions of the tubular structure. In preferred practice, a funnel-like roller-carrying end assembly is provided near one end of the tubular structure to define a constricted discharge opening through which the moving material discharges.

A glide tube ring for tube-in-tube systems is disclosed in U.S. Pat. No. 5,592,975. The glide ring tube according to the invention is provided with axially spaced glides running parallel to each other whose material has the lowest possible friction coefficient, especially a plastic, preferably a fiberglass-reinforced polyethylene, polyamide or the like, in which the glide tube ring is attached to the central tube forming a closed ring that centers this tube in the protecting tube, pipe conduit or the like.

BRIEF SUMMARY OF THE INVENTION

The present invention addresses the aforementioned problems encountered in the prior art by providing a flow line(s) spacer/centralizer which is manufactured to adjoin the insulating jacket, protect the insulation from the casing pipe, act as a dragging surface for the installation of the flow line(s) inside the casing for longer sections, allow multiple flow lines of various sizes to be bundled and inserted at the same time, by adding wheels to replace the ear section on the spacer body allowing the installation contractor to pull longer sections with fewer sectional tie-in welds on both the flow line(s) and casing thereby speeding up the installation time and reducing cost. The present invention requires only one spacer per 40-foot pipe joint to be installed, saving labor, speeding installation and lowering cost.

The present invention thus provides an improved piping assembly having an outer casing with an annular containment space for holding one or more product flow lines, the casing having a bore and an inner wall portion surrounding the bore.

One or more product flow lines is surrounded by insulation and positioned within the outer casing, the insulation having a generally cylindrically-shaped outer surface that has a diameter smaller than the diameter of the casing bore.

A plurality of spacers are positioned along the flow lines at intervals, each spacer having projecting portions for engaging the inner wall of the casing or having the proper full body diameter to contact the inner wall of the casing when the product flow lines are pulled through the casing. In small pipe-in-pipe bundles where tolerances are very close (±0.125 inch) there is no space for an ear section. For example, a 6"×10" centralizer with 1.5" body thickness may not have ears.

Each spacer includes a pair of halves that can be assembled together about the flow line, each half being an integral member that includes a body, flanged portions, and optionally projecting portions with drag surfaces thereon.

Each of the halves includes corresponding flanged portions that abut face-to-face upon assembly of the halves. A bolted connection is used for example to assemble the halves together at the flanged portions. Alternatively, bolts may go through the body of the spacer itself.

The projecting portions extend longitudinally and radially with respect to the central axis of the flow line. Each half has at least a pair of projecting portions thereon. Each half has annular shoulder fore and aft that mate with adjacent insulation to avoid heat loss.

In one embodiment, each projecting portion has a wheeled member thereon at the drag surface.

Each projecting portion is preferably a fixed plastic member that is integrally formed with its body half, the body, flanges, and projecting portions being of a plastic, integral construction.

Each of the projecting portions includes one or more inclined surfaces. Each of the projecting portions includes a drag surface that is generally parallel to the central axis of the product flow line and wherein each inclined surface forms an angle with the drag surface. This construction lessens stress to prevent shear damage to the projecting portions during a pulling of the flow lines through the casing.

Each of the projecting portions includes a drag surface that is generally parallel to the central axis of the product flow lines and an inclined surface that forms an obtuse angle with the drag surface. The drag surfaces are preferably generally flat or slightly curved to fit the casing wall.

As used herein, "engaging portion" means that portion of the spacer which engages the inner wall of the casing. In some cases, the engaging portion will be a projecting portion. In other cases, where there are no projecting portions, the engaging portion is simply the outer portion of the spacer which engages the casing.

A layer of metallic insulation can be provided that surrounds the flow line. Alternatively, the insulating barrier can be a ceramic latex paint put on the outside surface of the product flow line.

Insulation for the flow lines can include a first layer of insulation of foam, and second and third layers of insulation that surround the flow line and the foam, the second and third layers being metallic foil layers.

The inside diameter of the outer casing pipe can be coated with an insulating barrier such as a ceramic latex paint that will enhance the reflective capacity of the outer casing pipe to prevent the colder temperatures from entering the casing, thereby allowing more heat to stay inside the product flowline area.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a front elevational view of the preferred embodiment of the present invention illustrating the concentric centralizer and spacer portion thereof;

FIG. 3 is a partial front elevational view of the preferred embodiment of the apparatus of the present invention illustrating a eccentric centralizer portion thereof;

FIG. 9 is a partial perspective view of the preferred embodiment of the apparatus of the present invention illustrating the eccentric centralizer portion thereof;

FIG. 10 is a partial front elevational view of the preferred embodiment of the apparatus of the present invention showing a concentric centralizer portion thereof for small diameter pipe;

FIG. 11 is a partial side elevational view of the preferred embodiment of the apparatus of the present invention showing a concentric centralizer for small diameter pipe;

FIG. 12 is a partial plan view of the preferred embodiment of the apparatus of the present invention showing a concentric centralizer for small diameter pipe;

FIG. 13 is a partial perspective view of the preferred embodiment of the apparatus of the present invention showing a concentric centralizer for small diameter pipes;

FIG. 14 is a partial front elevational view of the preferred embodiment of the apparatus of the present invention showing an eccentric rolling centralizer portion thereof for large diameter pipe;

DETAILED DESCRIPTION OF THE INVENTION

Figure 1:
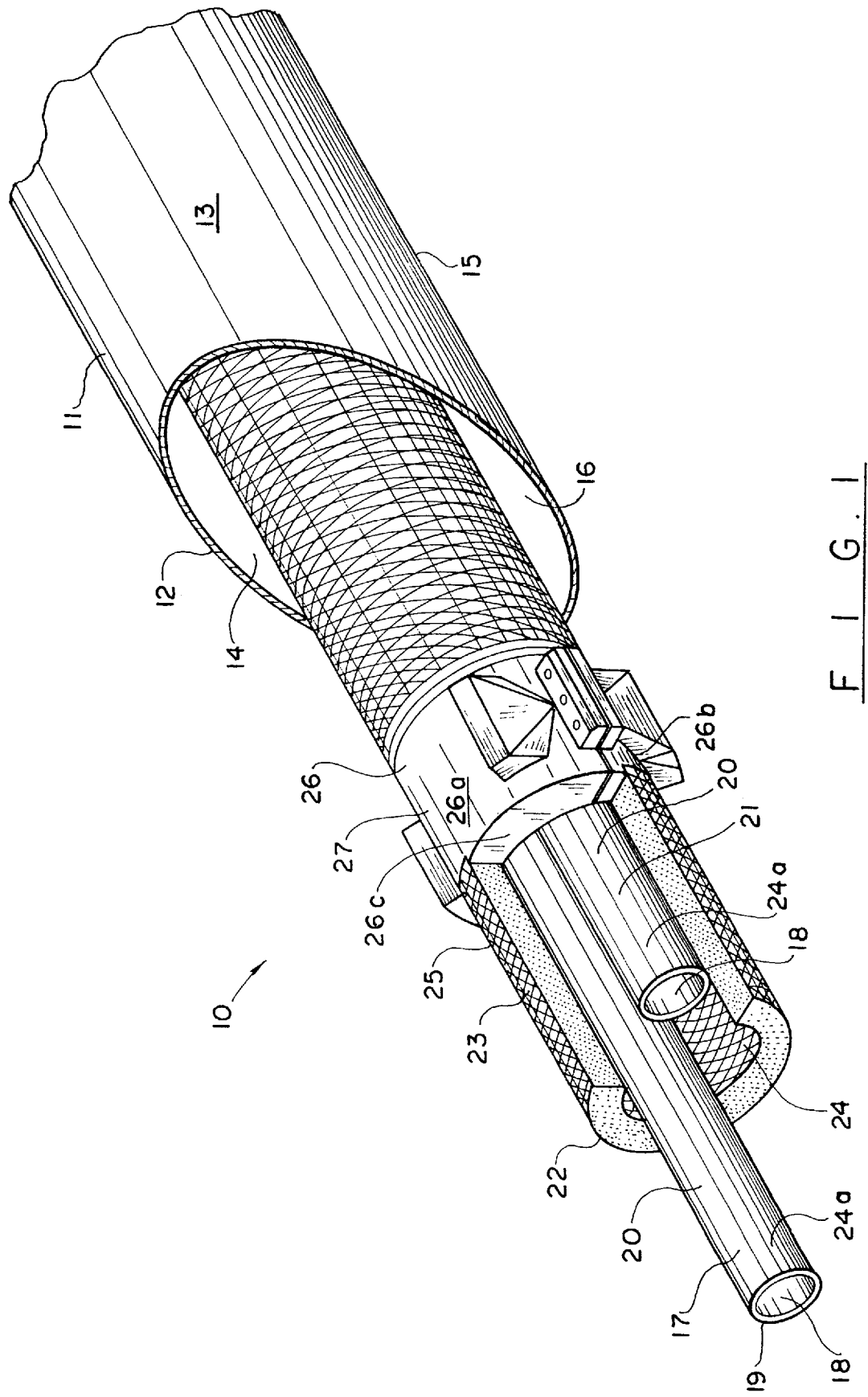
FIG. 1 is a perspective, partially cut away view of the preferred embodiment of the apparatus of the present invention.
Figure 5:
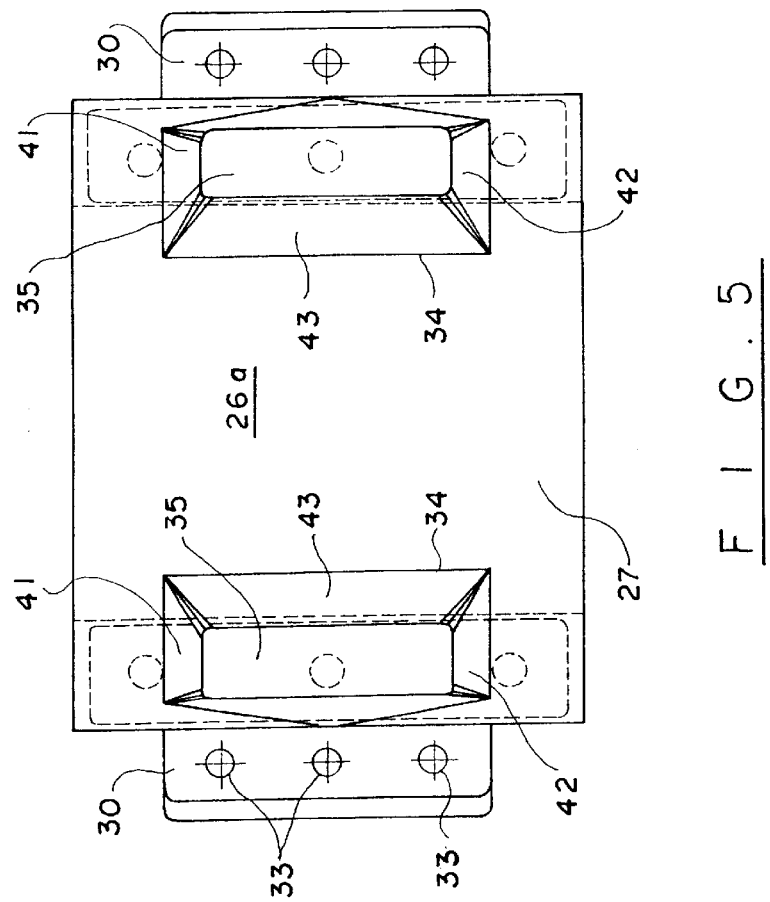
FIG. 5 is a partial plan view of the preferred embodiment of the apparatus of the present invention illustrating concentric and eccentric centralizer portions thereof.
Figure 4:
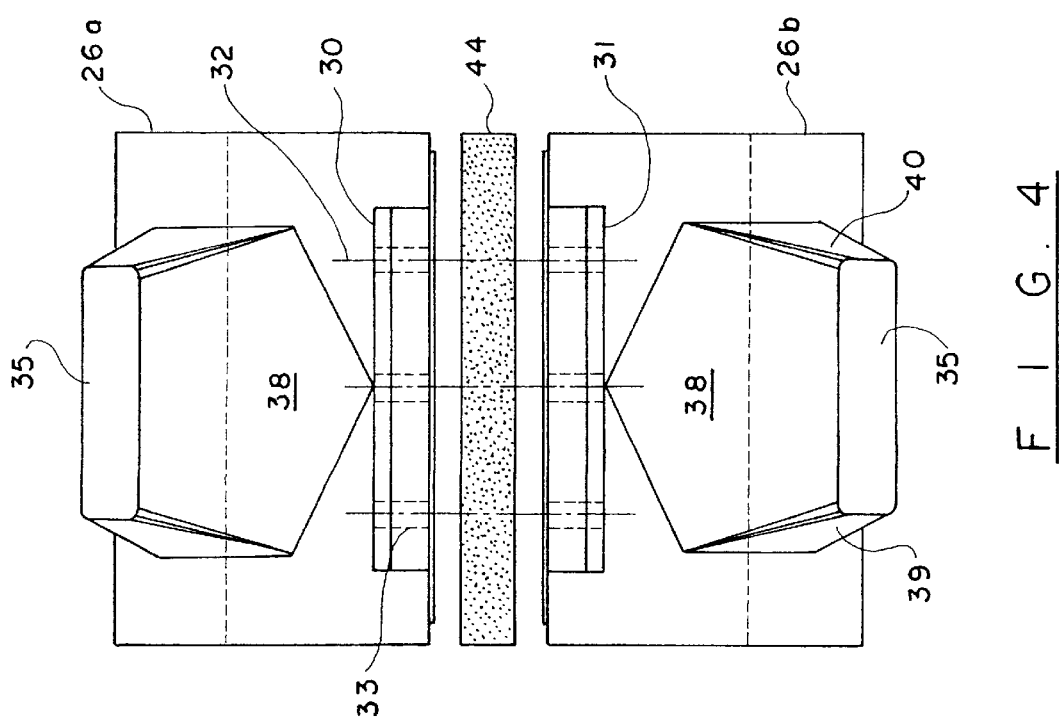
FIG. 4 is a partial side elevational view of the preferred embodiment of the apparatus of the present invention illustrating the concentric and eccentric centralizer portion thereof.
Figure 6:
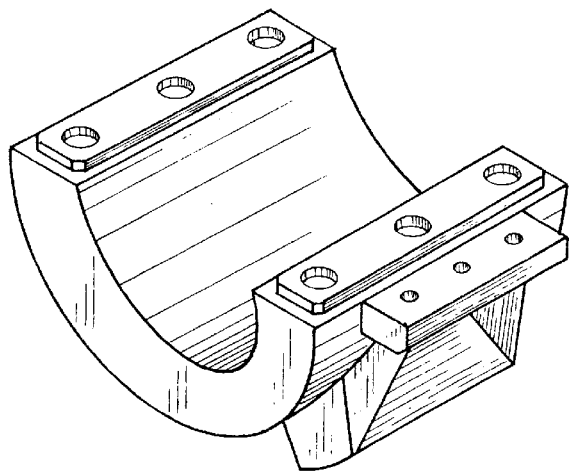
FIG. 6 is a partial perspective view of the preferred embodiment of the apparatus of the present invention illustrating the concentric centralizer portion thereof.
Figure 7:
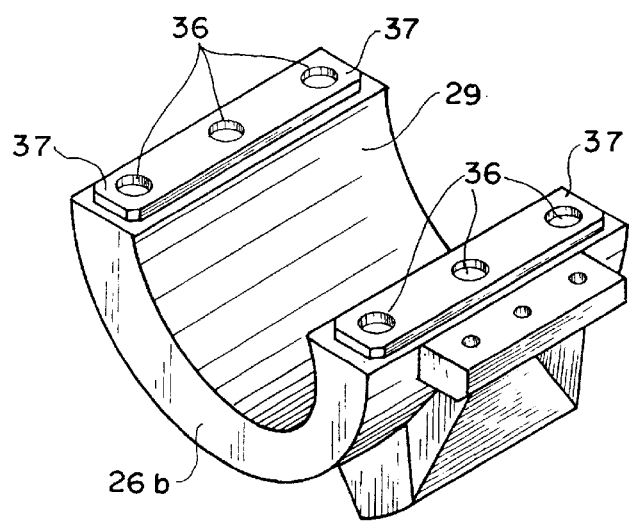
FIG. 7 is another partial perspective view of the preferred embodiment of the present invention illustrating an eccentric centralizer portion thereof.
Figure 8:
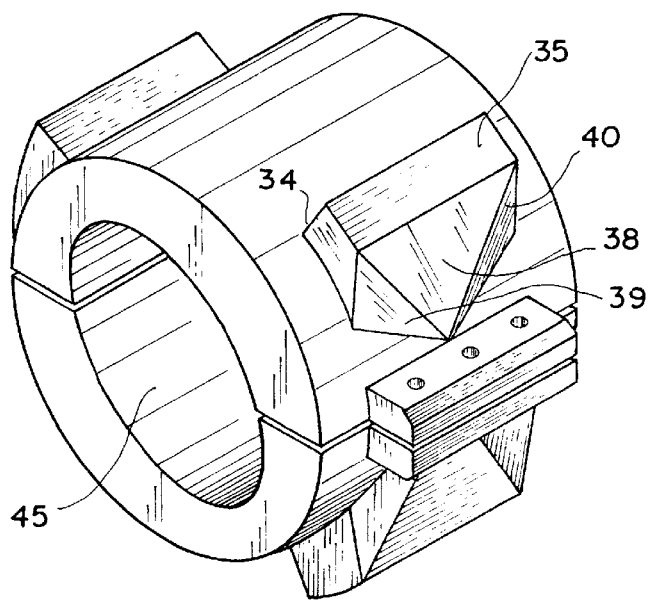
FIG. 8 is a partial perspective view of the preferred embodiment of the apparatus of the present invention illustrating the concentric centralizer portion thereof.
Figure 15:
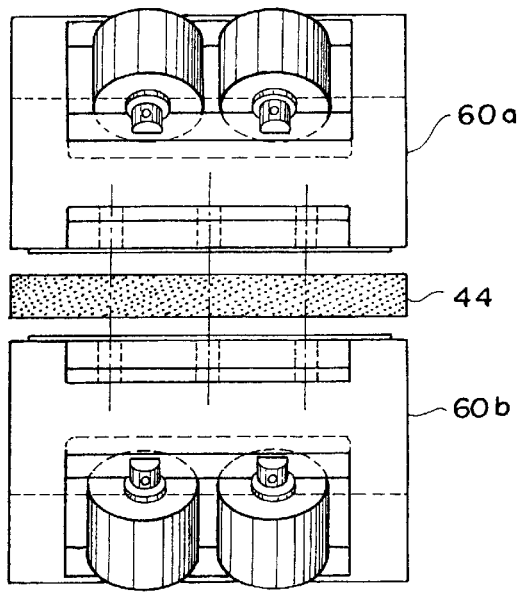
FIG. 15 is a partial side elevational view of the preferred embodiment of the apparatus of the present invention illustrating a concentric/eccentric rolling centralizer for large diameter pipe.
Figure 16:
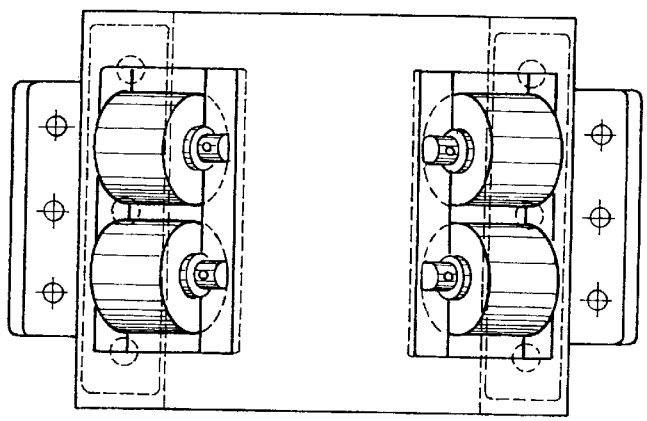
FIG. 16 is a partial plan view of the preferred embodiment of the apparatus of the present invention illustrating a concentric/eccentric rolling centralizer for large diameter pipes.
Figure 17:
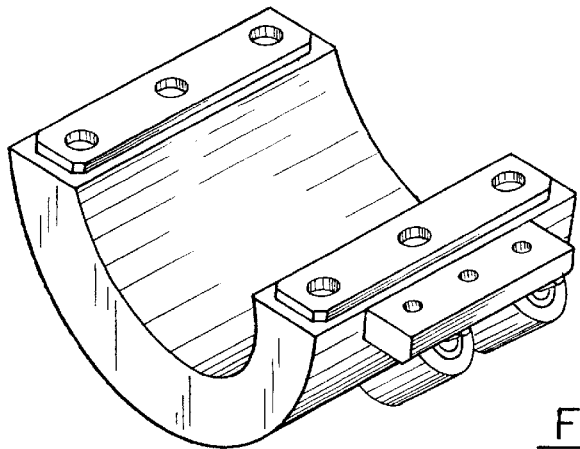
FIG. 17 is a partial perspective view of the preferred embodiment of the apparatus of the present invention illustrating a concentric rolling centralizer for large diameter pipe.
Figure 18:
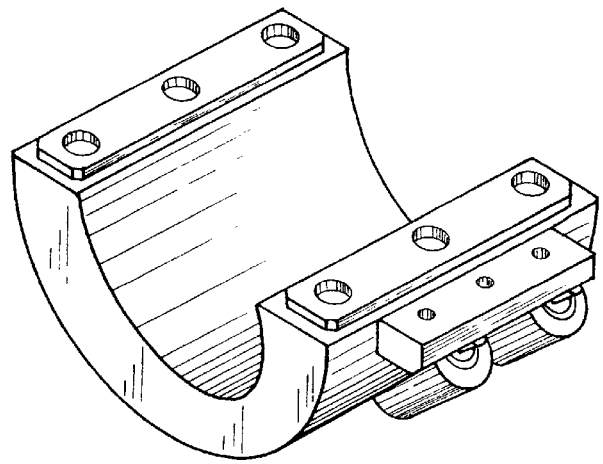
FIG. 18 is a partial perspective view of the preferred embodiment of the apparatus of the present invention illustrating an eccentric rolling centralizer for large diameter pipe.

FIG. 1 shows generally the preferred embodiment of the apparatus of the present invention designated by the numeral 10 in FIG. 1. Piping assembly 10 includes an outer casing 11 having a generally cylindrically-shaped wall 12. Wall 12 provides an outer surface 13 and an inner surface 14, both generally cylindrically shaped.

Casing 11 can have a drag coating surface 15 so that it can be pulled during installation across a seabed, for example. Casing 11 has a hollow bore or annular containment space 16 for containing one or more product flow lines 17, 21. The product flow line 17 has a longitudinally extending flow bore 18 that is surrounded by cylindrically-shaped wall 19 having an outer cylindrically-shaped surface 20. Similarly, the product flow line 21 has flow bore 18, wall 19, and outer surface 20.

The two product flow lines 17, 21 are surrounded by preferably three layers of insulation. This includes a first thickest insulation layer 22 that can be of polymeric foam, for example. On the outer surface of insulation layer 22, there is provided outer foil layer 23 that is also an insulating layer, being of a foil metallic material.

Inner foil layer 24 provides another insulating layer in between the flow lines 17, 21 and foam insulation layer 22. Ceramic latex paint 24A can be applied to the outer surface 20, of the two product flow lines 17, 21 to add another insulating layer. A plurality of spacer bodies 26 are disposed at intervals along the flow lines 17, 21 (e.g., one per 40' joint of pipe). In between two successive spacer bodies 26, the insulation 22, 23, 24 is provided. Each spacer has fore and aft annular shoulders 26C that mate with the adjacent insulation 22, 23, 24 to eliminate heat loss. This provides an outer cylindrical surface 25 of the insulation layers 22, 23, 24 that is correspondingly configured to mate with an outer cylindrical surface 27 of the spacer bodies 26 as shown in FIG. 1.

As shown in FIGS. 1–11, each spacer body 26 is formed of a pair of spacer halves 26A, 26B. The spacer half 26A can provide a generally semi-circular curved surface 28 while the spacer half 26B provides an eccentrically-shaped curved surface 29. Each of the spacer halves 26A, 26B provides respective flange portions 30, 31. These flanges enable the spacer halves 26A, 26B to be bolted together using bolted connections. Bolt center lines 32 indicate the location of each bolt center after it passes through the bolt holes 33 in order to form the bolted connection at flanges 30, 31. A raised face 37 is provided on each of the flanges 30, 31 so that upon assembly, the respective raised face portions 37 of each flange 30, 31 align and abut to form a seal with casket layer 44.

The outer surface 27 of spacer body 26 provides a plurality of projecting portions 34. Each projecting portion 34 provides a drag surface 35 that engages the inner surface 14 of casing 11 as the assembly of flow lines 17, 21, insulation layers 22, 23, 24, and spacers 26 is pulled through annular containment space or bore 16 of casing 11.

A plurality of cylindrical sockets 36 can be provided on each flange portion 30, 31 at raised face 37 for allowing the gasket layer 44 to flow into the sockets 36 enhancing a seal. The projecting portions 34 are comprised of a plurality of inclined surfaces 38, 39, 40, end surfaces 41, 42, and radial surface 43, a surface that runs generally perpendicular to the outer surface 27 of spacer 26, or along a radially extending plane.

A second spacer construction is shown in FIGS. 11–13, namely spacer body 50. The spacer body 50 has a pair of spacer halves 50A, 50B. The spacer body 50 is configured for use with smaller diameter pipe, having smaller projecting portions 52, 53 (if necessary). The projecting portion 52 is larger than the projecting portion 53 in that the projecting portions 53 form a projecting portion at the joint in between the two halves 50A, 50B as shown in FIG. 13. The two projecting portions 53 together equal the size of projecting portion 52. Projecting portions 53 act as a drag ear should the flowlines twist or turn during installation.

Spacer body 50A also provides bolt center lines 54 at bolt receptive openings 55 for forming a bolted connection at each opening 55 to assemble and hold the spacer halves 50A, 50B together upon assembly.

Each projecting portion 52, 53 provides a drag surface 56 thereon and a peripheral surface 57 that communicates with the outer surface of the spacer body 50 as shown in FIGS. 10–13. As with the spacer of FIGS. 2–9, a raised face 58 is provided for forming a seal with gasket layer 44 upon assembly. In FIG. 13, the spacer body 50 is shown assembled, providing an open ended cylindrically-shaped bore 59.

In FIGS. 13–20, spacer 60 is shown having wheeled portions 67 thereon. The spacer body 60 is comprised of a pair halves 60A, 60B. The innermost surface of each of the halves 60A, 60B provides respective curved surfaces 61, 62. The curved surface 61 can be generally semi-circular in cross section while the curved surface 62 is an eccentrically-shaped curved surface.

Figure 19:
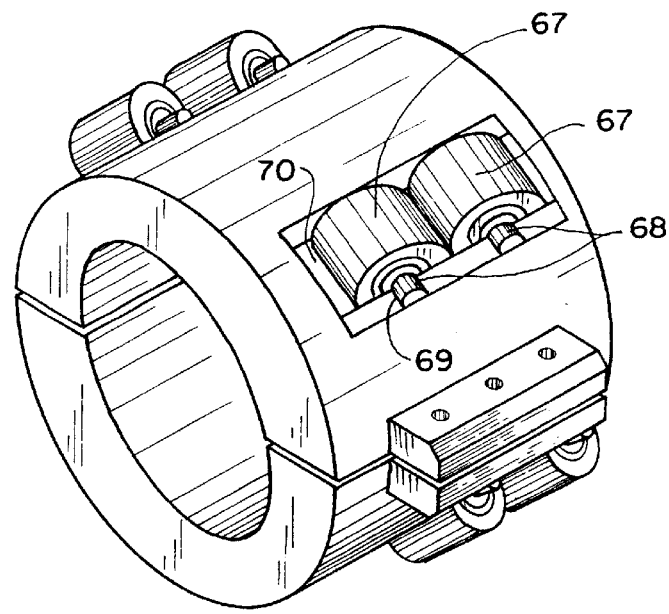
FIG. 19 is a partial perspective view of the preferred embodiment of the apparatus of the present invention illustrating a concentric rolling centralizer for large diameter pipes.
Figure 20:
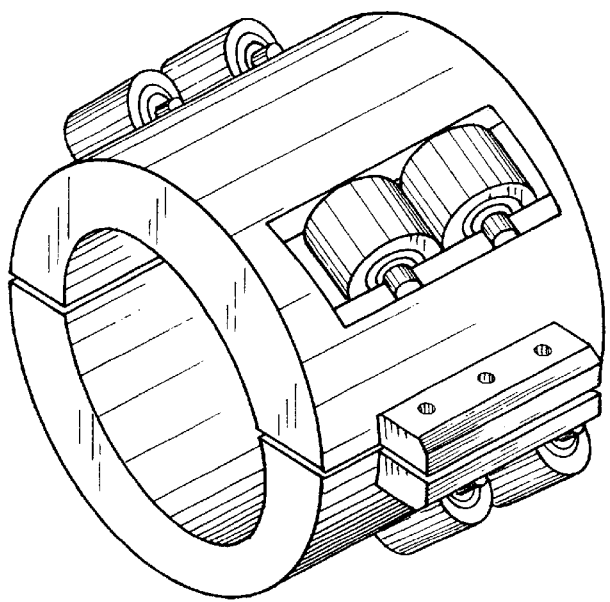
FIG. 20 is a partial perspective view of the preferred embodiment of the apparatus of the present invention illustrating an eccentric rolling centralizer for large diameter pipes.

A pair of flanges 63, 64 can be used for bolting the halves 60A, 60B together. In FIG. 14, bolt center line 65 tracks the center of bolt holes 66 through which bolted connections can be placed in order to assemble the halves 60A, 60B together. Wheel 67 fits a recess 70 as shown in FIG. 19. Each wheel 67 can be rotatably mounted upon shaft 68 that is attached to spacer body 60 at bearings 69.

The following table lists the parts numbers and parts descriptions as used herein and in the drawings attached hereto.

| Part Number | PARTS LIST Description |
|---|---|
| 10 | piping assembly |
| 11 | casing |
| 12 | wall |
| 13 | outer surface |
| 14 | inner surface |
| 15 | drag coating |
| 16 | annular containment space |
| 17 | product flow line |
| 18 | flow bore |
| 19 | wall |
| 20 | outer surface |
| 21 | product flow line |
| 22 | insulation layer |
| 23 | outer foil layer |
| 24 | inner foil layer |
| 24A | ceramic latex paint |
| 25 | outer cylindrical surface |
| 26 | spacer body |
| 26A | spacer half |
| 26B | spacer half |
| 26C | annular shoulder |
| 27 | outer cylindrical surface |
| 28 | semicircular curve |
| 29 | eccentric curve |
| 30 | flange |
| 31 | flange |
| 32 | bolt center line |
| 33 | bolt hole |
| 34 | projecting portion |
| 35 | drag surface |
| 36 | cylindrical socket |
| 37 | raised face |
| 38 | inclined surface |
| 39 | inclined surface |
| 40 | inclined surface |
| 41 | end surface |
| 42 | end surface |
| 43 | radial surface |
| 44 | gasket layer |
| 45 | open ended bore |
| 50 | spacer body |
| 50A | spacer half |
| 50B | spacer half |
| 51 | socket |
| 52 | large projecting portion |
| 53 | small projecting portion |
| 54 | bolt center line |
| 55 | opening |
| 56 | drag surface |
| 57 | peripheral wall |
| 58 | raised face |
| 59 | bore |
| 60 | spacer |
| 60A | spacer half |
| 60B | spacer half |
| 61 | curved surface |
| 62 | curved surface |
| 63 | flange |
| 64 | flange |
| 65 | bolt center line |

PARTS LIST -continued

| Part Number | Description |
|---|---|
| 66 | bolt hole |
| 67 | wheel |
| 68 | shaft |
| 69 | bearing |
| 70 | recess |

The foregoing embodiments are presented by way of example only; the scope of the present invention is to be limited only by the following claims.

I claim:

1. A piping assembly comprising:
    a) an outer casing having an annular containment space for holding one or more product flow lines, the casing having a bore and an inner wall portion surrounding the bore;
    b) a product flow line surrounded by a plurality of spaced apart insulation sections, the insulation sections having a generally cylindrically shaped outer surface during use that has a diameter smaller than the diameter of the casing bore;
    c) a plurality of insulating spacers positioned along the flow lines at intervals, each spacer having projecting portions for engaging the inner wall of the casing when the product flow lines are pulled through the casing, each spacer abutting a pair of insulation sections;
    d) each spacer comprising:
        a pair of insulating spacer halves that can be assembled together about the flow line, each insulating half being an insulating member that includes a body, flanged portions, and projecting portions with drag surfaces;
        each of the insulating spacer halves having corresponding flanged portions that abut face to face upon assembly of the halves;
        the projecting portions extending longitudinally and radially with respect to the central axis of the flow line;
        wherein each half has at least a pair of projecting portions; and
    e) the insulation sections and insulating spacers having abutting annular shoulders that minimize heat loss from the product flow line.

2. The piping assembly of claim 1 wherein each of the projecting portions is wheeled.

3. The piping assembly of claim 1 wherein each of the projecting portions is a fixed plastic member integrally formed with its body half.

4. The piping assembly of claim 1 wherein each of the projecting portions includes inclined surface portions.

5. The piping assembly of claim 1 wherein each of the projecting portions includes a drag surface that is generally parallel to the central axis of the product flow line and an inclined surface that forms an angle with the drag surface.

6. The piping assembly of claim 1 wherein each of the projecting portions includes a drag surface that is generally parallel to the central axis of the product flow line and an inclined surface that forms an obtuse angle with the drag surface.

7. The piping assembly of claim 1 wherein each of the projecting portions includes a generally flat drag surface.

8. The piping assembly of claim 1 further comprising a layer of metallic insulation surrounding the flow line.

9. The piping assembly of claim 1 wherein the insulation is a first layer of insulation, and further comprising second and third layer of insulation surrounding the flow line, the second and third layers being foil insulation layers.

10. The piping assembly of claim 1 wherein the insulation is a first layer of insulation, and further comprising second and third layer of insulation surrounding the flow line, the second and third layers being metallic foil insulation layers.

11. The assembly of claim 1, further comprising ceramic latex paint on the flow line.

12. The piping assembly of claim 1 further comprising a plurality of bolted connections that extend through the abutting flanges for securing the halves together.

13. A piping assembly comprising:
    a) an outer casing having an annular containment space for holding one or more product flow lines, the casing having a bore and an inner wall portion surrounding the bore;
    b) a plurality of product flow lines surrounded by a plurality of insulation sections, the insulation sections each having a generally cylindrically shaped outer surface that has a diameter during use that is smaller than the diameter of the casing bore, the insulation sections including a wall of insulating material having a wall thickness;
    c) a plurality of plastic, integral insulating spacers positioned along the product flow lines at intervals, each spacer having a spacer wall of insulating material of about the same wall thickness as the insulation section wall thickness, projecting portions with wear surfaces thereon extending from the spacer wall for engaging the inner wall of the casing when the product flow lines, surrounding insulation sections, and insulating spacers are pulled through the casing;
    d) insulating each spacer comprising:
        a pair of spacer halves that can be assembled together about the flow lines, each half being an integral member that includes a body comprising part of said spacer wall, flanged portions, and said projecting portions with wear surfaces thereon;
        each of the spacer halves having corresponding flanged portions that abut face to face upon assembly of the halves;
        the projecting portions extending longitudinally and radially with respect to the central axis of the flow line;
        wherein each half has at least a pair of projecting portions.

14. The piping assembly of claim 13 wherein each of the projecting portions carries a wheeled portion.

15. The piping assembly of claim 13 wherein each of the projecting portions has multiple generally flat surfaces thereon, at least two of the flat surfaces defining an obtuse angle.

16. The piping assembly of claim 13 wherein each of the projecting portions has multiple generally flat surfaces thereon, at least one of the surfaces being a first surface that is generally parallel to the central longitudinal axis of the flow lines and two other of the flat surfaces each defining an obtuse angle with said first surface.

17. The piping assembly of claim 13 wherein there are two product flow lines positioned side by side, and each spacer surrounds the two flow lines.

18. The piping assembly of claim 13 wherein the insulation layer has an outer surface that is of a generally cylindrical shape and the spacers have a spacer body that includes a cylindrical outer surface portion that is about the same configuration as the cylindrical outer surface of the insulation layer.

19. The pipe assembly of claim 13, wherein there are at least two product flow lines positioned side by side or stacked on top of each other, and each spacer surrounds the flow lines.

20. The piping assembly of claim 13 further comprising a plurality of bolted connections that extend through the abutting flanges for securing the halves together.

21. A piping assembly comprising:
   a) an outer casing having an annular containment space for holding one or more product flow lines, the casing having a bore and an inner wall portion surrounding the bore;
   b) a product flow line surrounded by a plurality of insulation sections, the insulation sections having a generally cylindrically shaped outer surface during use that has a diameter smaller than the diameter of the casing bore;
   c) a plurality of insulating spacers positioned along the flow lines at intervals, each spacer having engaging portions for engaging the inner wall of the casing when the product flow lines are pulled through the casing;
   d) each insulating spacer comprising:
      a pair of spacer halves that can be assembled together about the flow line, each half being an integral member that includes a body, flanged portions, and engaging portions with drag surfaces;
      each of the halves having corresponding flanged portions that abut face to face upon assembly of the halves;
      the engaging portions extending longitudinally and radially with respect to the central axis of the flow line; and
   e) the insulation sections and insulating spacer having correspondingly shaped transverse cross sectional generally cylindrical portions with abutting annular shoulders that minimize heat loss from the product flow line.

* * * * *